United States Patent [19]
DeMarti, Jr. et al.

[11] Patent Number: 5,461,454
[45] Date of Patent: Oct. 24, 1995

[54] PHOTOFINISHING METHOD AND APPARATUS

[75] Inventors: Jack C. DeMarti, Jr., Rochester; Walter C. Slater, Prattsburg, both of N.Y.

[73] Assignee: Eastman Kodak Company, Rochester, N.Y.

[21] Appl. No.: 241,877

[22] Filed: May 12, 1994

[51] Int. Cl.⁶ ...................................................... G03B 27/52
[52] U.S. Cl. ................... 355/41; 355/77; 355/133
[58] Field of Search ........................ 354/297, 313, 354/317–319, 83; 355/27, 28, 72, 75, 40, 41; 198/502.1; 226/11, 90, 91

[56] References Cited

U.S. PATENT DOCUMENTS

| | | | |
|---|---|---|---|
| 3,747,493 | 7/1973 | Glidden et al. | 354/83 |
| 3,753,486 | 8/1973 | Vogt et al. | 198/502.1 |
| 4,059,211 | 11/1977 | Brizzolara | 226/91 X |
| 4,203,664 | 5/1980 | Clifton et al. | 355/64 |
| 4,204,733 | 5/1980 | Modney et al. | 355/64 |
| 4,627,719 | 12/1986 | Nitsch et al. | 355/41 |
| 4,843,430 | 6/1989 | Huber et al. | 354/313 X |
| 4,888,613 | 12/1989 | Zangenfeind et al. | 355/41 |
| 5,093,686 | 3/1992 | Shigaki | 355/77 |
| 5,157,439 | 10/1992 | Sakamoto et al. | 355/28 |

FOREIGN PATENT DOCUMENTS

0469594A2  2/1992  European Pat. Off. .
4038661.9  12/1990  Germany .

*Primary Examiner*—D. Rutledge
*Attorney, Agent, or Firm*—Frank Pincelli

[57] ABSTRACT

Photofinishing method and apparatus of the type for handling film in a cartridge of the type capable of thrusting film from inside to outside the cartridge in response to rotation of a film bearing spool inside the cartridge, includes a turret having a nest for receiving a cartridge and transporting the cartridge to a succession of work stations where operations are performed on the film in the cartridge.

20 Claims, 5 Drawing Sheets

5,461,454

PHOTOFINISHING METHOD AND APPARATUS

FIELD OF THE INVENTION

The present invention relates to a method and apparatus for photofinishing, and more particularly to such apparatus for use with the film cartridge of the type wherein the photographic film remains with the cartridge throughout a portion of or all of the photofinishing process.

BACKGROUND OF THE INVENTION

A photographic film handling method is disclosed in published European Patent Application 0469594A2 filed 31.07.91 by Takahashi et al, wherein a photographic film strip remains attached to its cartridge throughout the photofinishing process, including film processing and printing. The film cartridge is designed such that a spool in the cartridge is rotated in an unwinding direction, a film leader is caused to advance to the outside of the cartridge where it is further drawn out of the cartridge for processing and printing. Between each stage of the photofinishing process, the film is re-wound into the cartridge for handling. After photofinishing, the photographic film is returned in the cartridge to the customer, where it is protected from dirt and scratches. Conventional high volume photographic printers, such as the Kodak Class 35, AGFA MSP Multiscan Printer Series, Gretag 3141, and Kodak 3510, 2610, operate on large reels of spliced together film strips that have been removed from their cartridges. Different film formats such as 35 mm, size 110, and size 126 are accommodated simply by changing the printer's film gate decks, moving different lenses into a printing position and automatically moving paper mask sizes. A problem arises with the new film handling method wherein the filmstrip is not removed from the cartridge, since the existing printers are not adapted for printing film strips attached to cartridges. Photofinishers have a large investment in existing printing equipment and will hesitate to purchase a separate, stand-alone printer for the new photographic film handling method. In addition, devices that handle individual filmstrips attached to cartridges are much less efficient, at least in regard to through-put, as compared to devices that process continuous rolls.

SUMMARY OF THE INVENTION

The above problems are solved, according to the present invention, by providing a photofinishing apparatus having a turret with a nest for receiving a film cartridge of the type capable of thrusting film from inside to outside the cartridge in response to rotation of a film bearing spool inside the cartridge. A plurality of work stations are located around the turret. A drive mechanism is provided for engaging and rotating a film spool of a cartridge located at the work station and an apparatus is also provided for performing an operation on the film ejected from the cartridge at the work station. The turret rotates to move the nest to successive stations where successive operations are performed on the film in the cartridge or in the nest. This allows the printer to conduct several different functions simultaneously so as to increase the efficiency of the device. In a preferred embodiment, the invention is employed in an apparatus having means for receiving interchangeable decks, wherein a first deck capable of handling conventional reel-to-reel photographic film or a second deck capable of handling individual cartridge film, could be positioned.

DETAILED DESCRIPTION OF THE EMBODIMENTS

Figure 1:
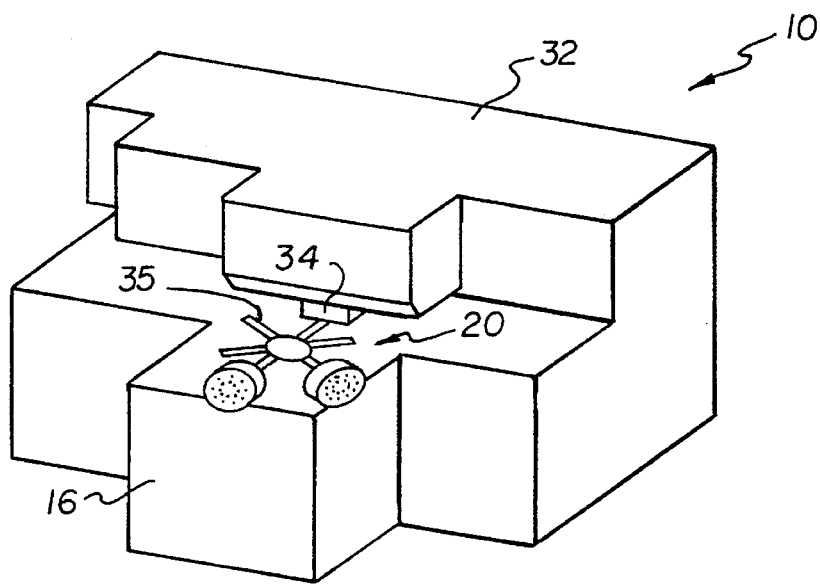
FIG. 1 is a perspective view of a photofinishing apparatus according to the present invention.
Figure 2:
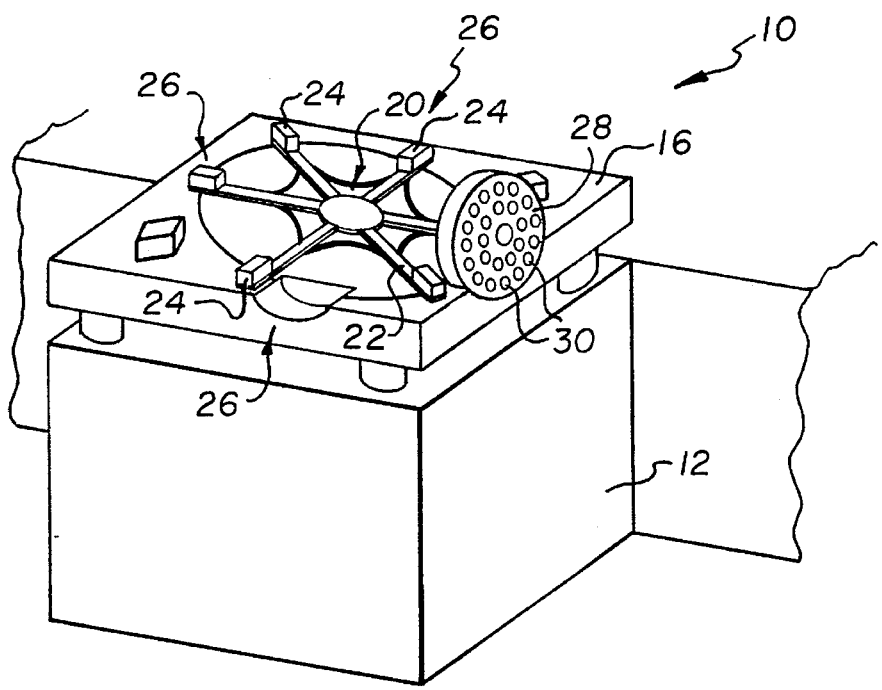
FIG. 2 is an enlarged perspective view of a portion of the photofinishing apparatus shown in FIG. 1.
Figure 6:
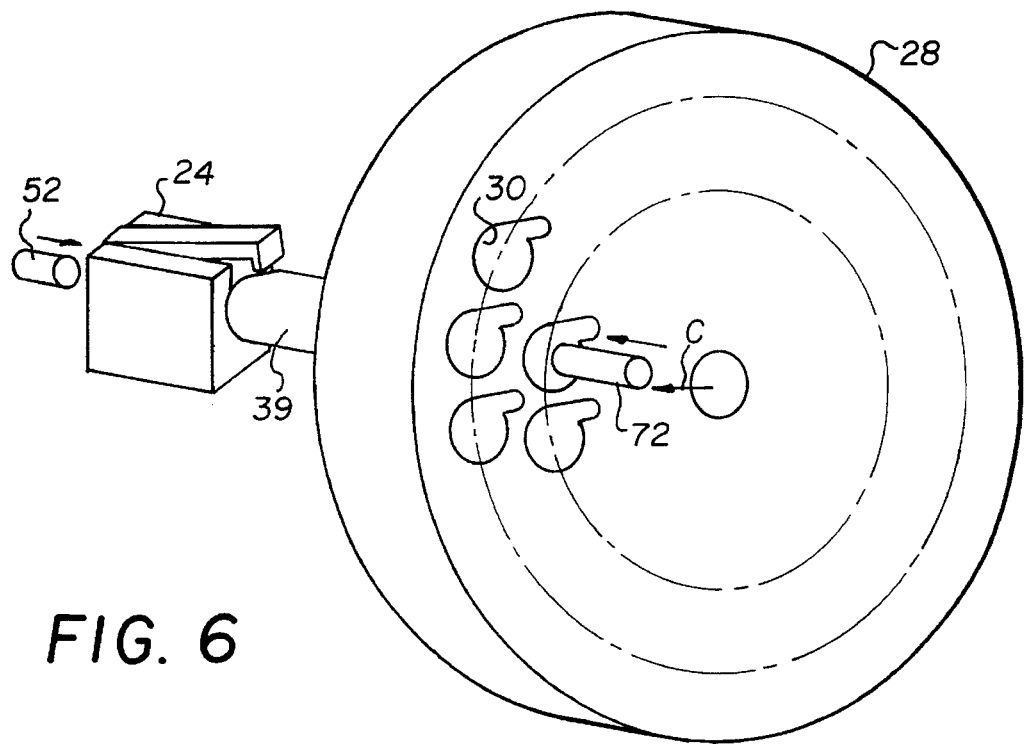
FIG. 6 is a perspective view of the cartridge magazine containing thrust film cartridges that can be used with the apparatus shown in FIG. 1.

FIG. 1 shows one example of photographic apparatus 10, according to the present invention. In this example, the apparatus 10 is a high speed photographic printer, such as an Eastman Kodak Company Class 35 Printer, to handle conventional reel-to-reel film or film contained in cartridges. A turret 20 is mounted to the apparatus 10 for rotation on platform 16. The turret 20 includes a plurality of arms 22 and a nest 24 on the end of each arm 22 for holding a film cartridge. The turret 20 rotates to position the arms 22 to its successive stations 26 located around the periphery of the turret 20. Each station 26 is adapted to perform an operation on the film or the cartridge in the nest 24. At least one station, and preferably two of the stations 26 are cartridge load/unload stations, where a film cartridge can be loaded into and unloaded from a nest 24 from or into a magazine 28. The magazine 28 shown in FIGS. 2 and 6 is a circular magazine having a plurality of holes 30 for holding cartridges. Alternatively, a tubular magazine may be employed which has a plurality of cartridges stacked end to end or side by side as is known in the art.

The base 12 of photographic apparatus 10 contains a motor (not shown) for operating the turret 20 and control electronics (not shown) for synchronizing the operation of the stations 26 and the turret 20.

At any one or all of the stations 26, the nest 24 or film cartridge on the turret 20 can be completely removed from the turret 20 and moved to the station for performing an operation on the cartridge and/or film within the cartridge. The photographic printer 10 is provided with a special print gate 34 at the print station 35 which is adapted to receive nest 24 and/or the cartridge so as to print the film contained in the cartridge.

Figure 3:
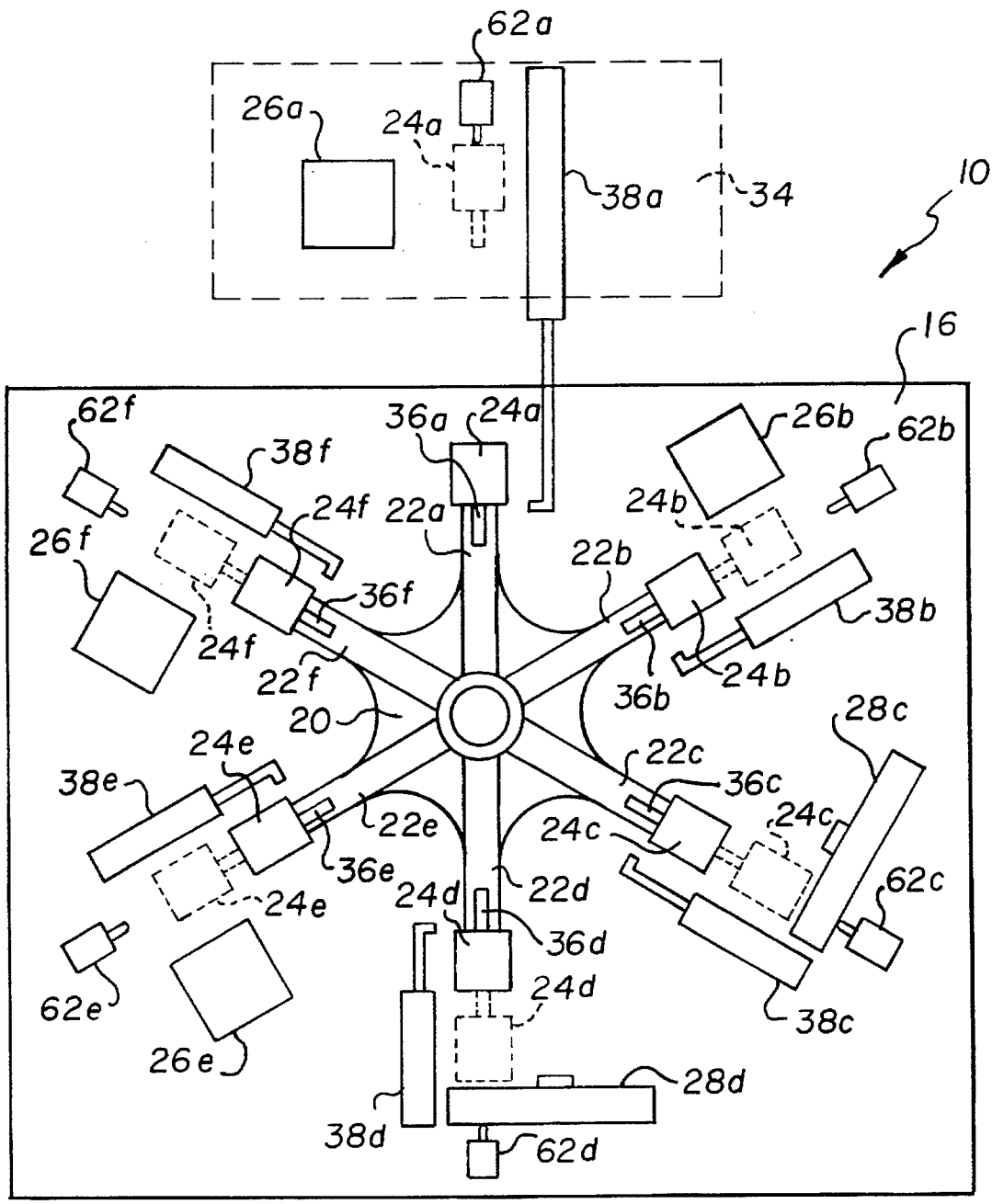
FIG. 3 is a top view of the turret mechanism of the apparatus shown in FIG. 2.

FIG. 3 is a top view of the turret 20 section of apparatus 10. The arms 22, the nest 24, and the stations 26 are separately indicated by subscripts a–f. The nests 24a–f are mounted on slides 36a–f on the respective arms 22a–f. At each work station 26, actuator 38a–f can engage the nest 24a–f located at that station, and move the nest 24a–f on the slide 36a–f to the position shown in phantom. The actuator 38a–f may be a pneumatic cylinder or an electric solenoid for example.

Figure 4:
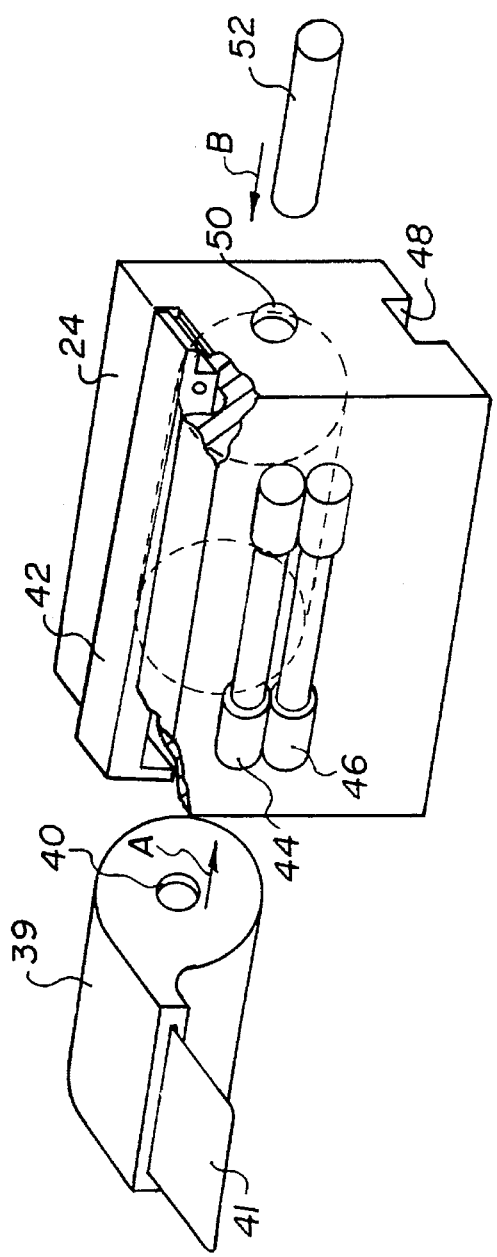
FIG. 4 is a perspective view of the cartridge nest used with the apparatus of FIG. 1.

As noted above, two stations 26c,d are film cartridge load/unload stations where a film cartridge 39 (see FIG. 4) may be loaded into a nest 24 from a magazine 28. At the load/unload stations 26c,d, cartridge 39 of the type capable of thrusting film 41 (shown in phantom) from the cartridge, or rewind the film back into the cartridge in response to rotation of a film bearing spool 40, is inserted into, or removed from nest 24. The nest 24 includes a cartridge clamp 42 that is hinged to the body of nest 24 and can be raised as shown in FIG. 4 to allow the cartridge 39 to be inserted into the nest. Examples of thrust type cartridges are set forth in U.S. Pat. Nos. 5,222,777; 5,031,852; and 5,215,273. A pair of film drive rollers 44, 46 are supported for rotation on the side of the nest 24 and positioned to receive the end of film strip 41, that is ejected from the cartridge 39, when the cartridge is in the nest 24.

In the embodiment illustrated, a notch 48 is provided in the bottom of the slide 36 on turret arm 22. Nest 24 defines a hole 50 through which an ejector pin 52 can be inserted at the stations to unload the cartridge from the nest. However, it is to be understood that any other means may be provided in the nest 24 for holding of the cartridge or for thrusting and rewinding the film from and back into the cartridge. Referring to FIG. 3, it will be noted that in the embodiment illustrated at the station 26, across from the print gate 34, the actuator 38a moves the nest 24a from the platform onto the printing gate.

Figure 5:
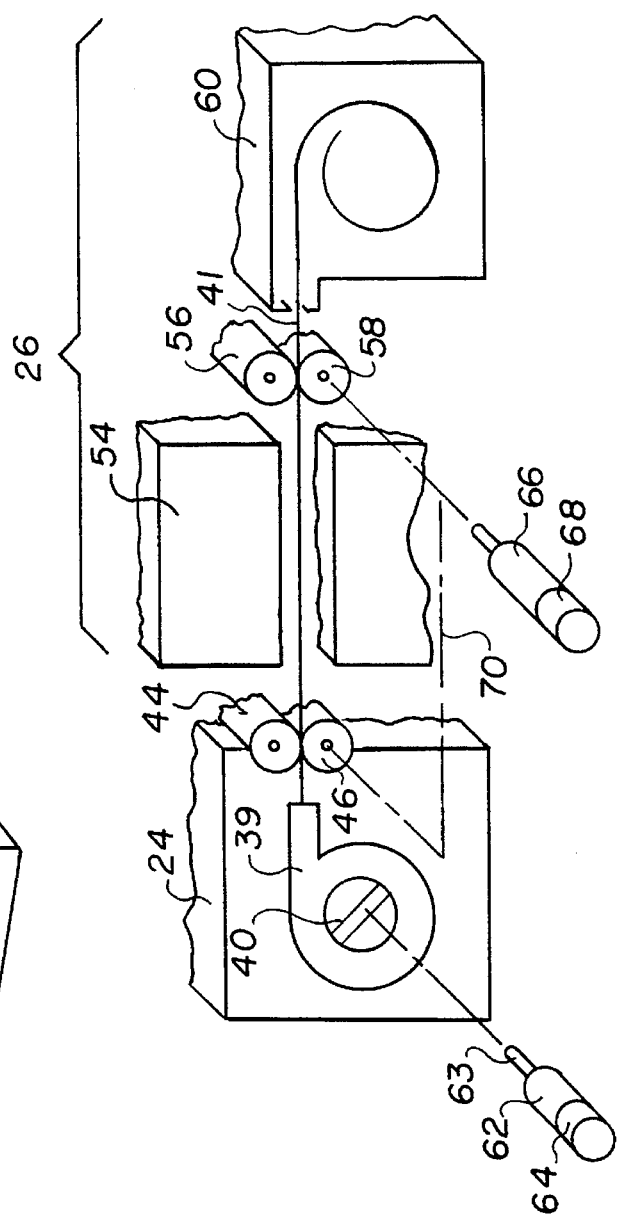
FIG. 5 is a schematic side view of a typical work station on the apparatus shown in FIGS. 1 and 2.

At each station 26, except for the load/unload stations 26c, d, the film 41 is driven from the cartridge 39 as shown in FIG. 5 through a processing section 54 by rotating the spool 40 in the appropriate direction by a drive shaft 63, of drive motor 62. The film is passed through the first pair of rollers 44, 46, through section 54 and then through a second pair of nip rollers 56, 58 into a festoon box 60, where the film 41 is held until it is re-wound into cartridge 39. Drive motor 62 is adapted to engage the spool 40 of cartridge 39 when the nest is moved to a station 26. The drive motor 62 is provided with an encoder 64 which assists in determining how much film has been thrust out of the cartridge. The motor 62 which drives the spool 40 in an unwinding direction until the film 41 is introduced into the nip of rollers 44, 46. The second drive motor 66, and associated encoder 68 has a drive train 70 (indicated by dash lines) which engages roller 58 and roller 46 for driving the roller 58. When the nest 24 is moved to a station 26, motor 67 engages roller 46 for taking over driving the film 41. Motor 66 takes over the driving of the film 41 from motor 67 after the film 41 has entered the nip of rollers 56, 58. The second drive motor 66 is employed at stations such as a scanner where a constant film velocity is desired. Alternatively, at stations where the film is advanced frame by frame, such as at the printing station where a constant velocity drive is not needed, second drive motor 66 may not be required.

The processing section 54 may comprise for example: a film scanning station; a printing station; a station for reading magnetic code recorded on a magnetic layer on the film (either a magnetic strip along the edge of the film or a transparent magnetic coating on the film); or a station for recording information on the magnetic layer on the film. In the presently preferred embodiment of the invention, processing section 54 at station 26a is a photographic printing gate; at station 26b, a magnetic recorder for writing on the magnetic strip associated with the film; at 26e, a magnetic reader for the magnetic strip on the film; and at 26f, a film scanner.

The magnetic film reader at station 26e may read information encoded thereon which can relate to a variety of information, for example original exposure, camera taking information-flash or illuminant type information, format-pseudo pan and zoom, IX information and for reorders or makeovers, color or exposure correction information, original RGB printing exposures, and which frames and how many prints to make for each frame.

The film scanner at station 26f scans the film for generating exposure control values for the printer, and also may be employed to make a digital image signal for driving an index printer to provide index prints.

The magnetics on film writer at station 26b may record data, such as, RGB density values employed in the printer. It is of course understood throughout that any other information that may be useful to the photofinisher, customer, or any other individual may be placed on the film.

Referring now to FIG. 6, the film cartridge magazine 28 at the load/unload station 26c, d is shown in more detail. The magazine 28 has a plurality of row holes 30 for holding film cartridge 39. After loading and unloading the cartridges in the outer ring of holes, the magazine 28 is indexed in the direction of arrow C and the cartridges in the inner ring of holes are loaded and unloaded. A description of similar suitable magazines is described in a coassigned application entitled Cartridge Magazine by Alan G. Reddig, Thomas C. Merle, Gerald F. Sherman and Alfonso Ianni, filed on May 12, 1994, Ser. No. 08/242,563, which is hereby incorporated by reference. In loading a cartridge from magazine 28 into nest 24, an actuator pin 72 is inserted into hole 30 that is aligned with the nest 24 and cartridge 39 is urged from the magazine 28 into the nest 24.

To unload a cartridge 39 from the nest 24 to the magazine 28, ejector pin 52 is inserted into the back of the nest 24 to urge the cartridge from the nest into associated hole 30 of the magazine.

Two load/unload stations 26c, 26d are provided so that an operator can change the magazine at one load/unload station while films are being processed at the other load/unload station. The number of cartridges designed to be held by the magazine is such that a convenient time elapses before all the cartridges are printed in one magazine, e.g. 10 minutes, allowing ample time to change the other magazine.

In the embodiment illustrated, the film is thrust out of the cartridge while in the nest at all of the stations except for the print station. However, the present invention is not so limited. For example, an appropriate mechanism may be provided for holding the cartridge at the station outside of the nest and for thrusting and rewinding the film out of or back into the cartridge.

Figure 7:
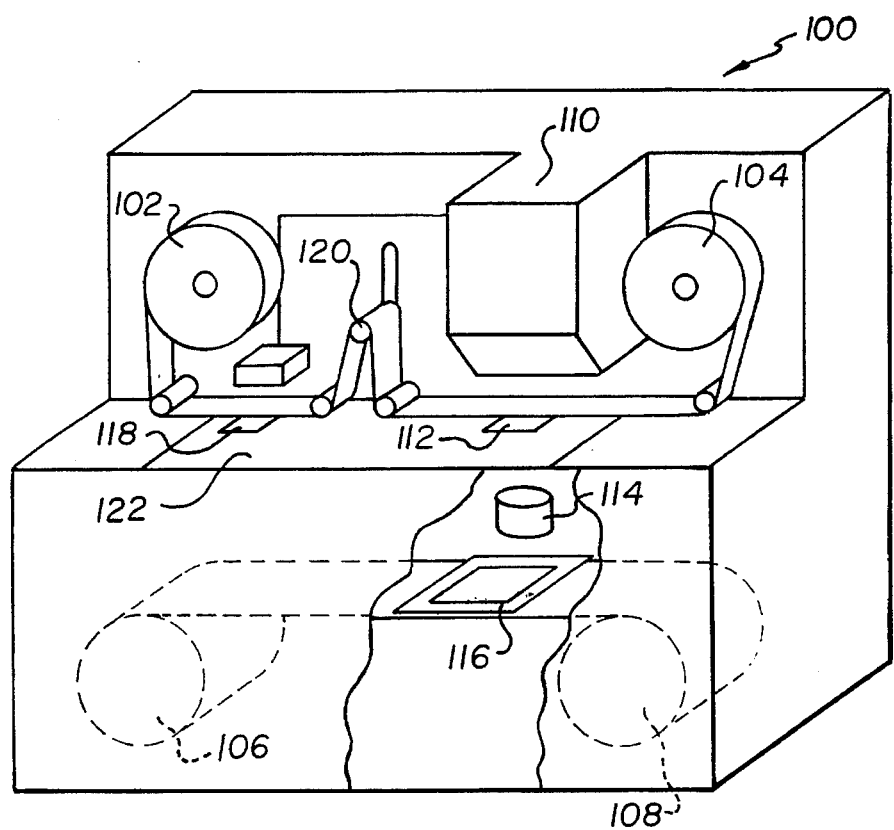
FIG. 7 is a perspective schematic view of a photofinishing printer capable of receiving replaceable decks for handling both strip film and cartridge loaded film.
Figure 8:
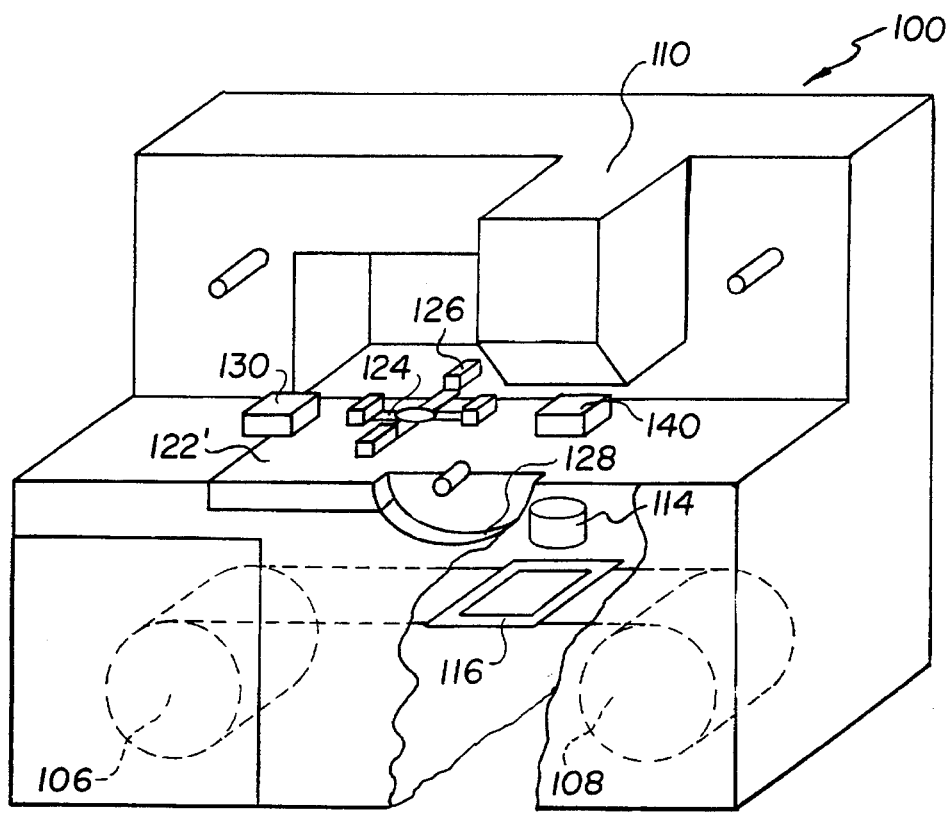
FIG. 8 is a schematic perspective view of the printer of FIG. 7 showing the printer having the cartridge loaded film deck including a turret according to the present invention.
Figure 9:
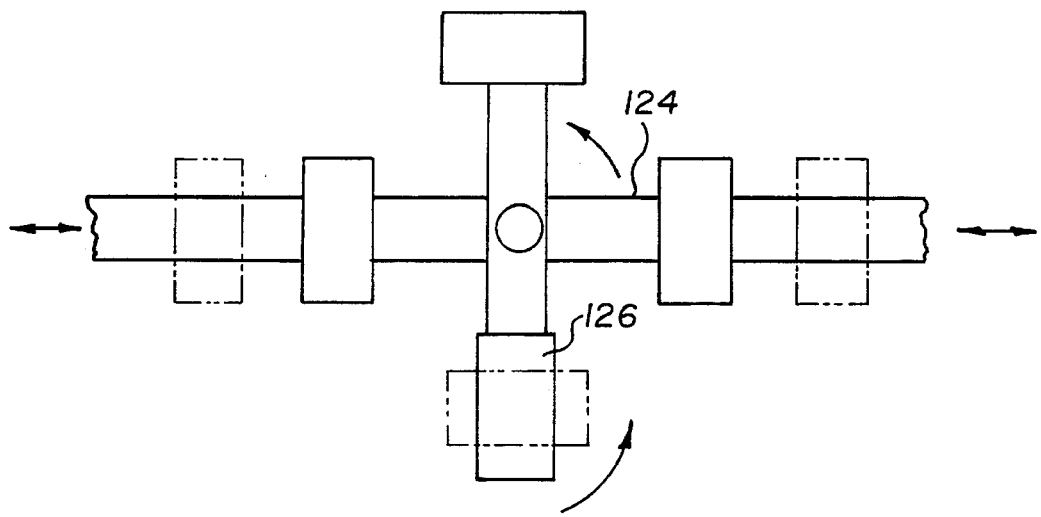
FIG. 9 is a schematic view of the turret mechanism of the printer shown in FIG. 8.

Referring now to FIG. 7, an alternative embodiment of the present invention will be described. A convertible photographic printer 100 includes a conventional spliced film supply 102 and take up 104, a paper supply 106 and take up 108, a lamp house 110, a printing station 112, a printing lens 114, a paper exposure gate 116, a scanning station 118, and a slack loop 120 for enabling a full order scan to be performed on the film strip prior to printing. The scanning station 118, the slack loop 120 and the printing station 112 are mounted on a removable module/deck 122. For printing conventional spliced rolls of film, the printer 100 is set up as shown in FIG. 7. For printing film in cartridges, the removable deck 122 is removed and replaced with a deck 122' as shown in FIG. 8 that contains a turret mechanism 124 that can move nests 126 between stations in the printer. The stations include a load/unload station represented by the depression 128 in the deck 122' for receiving a circular magazine of the type described above; a scan station 130 of the type described above and a printing station 140. As shown in FIG. 9, mechanism is provided for rotating the nest 126 at the load/unload station so that the cartridges can be loaded into the end of the nest as described with respect to the previous embodiment.

In the embodiments illustrated, the turret is shown as a part of the photofinishing apparatus. However, the turret assembly may be a separate device that may be wheeled up to or attached to the photofinishing apparatus. In which case appropriate connections should be provided for appropriate connecting of the devices.

Thus, the present invention provides a method and apparatus that can automatically handle individual film cartridges in a photofinishing apparatus at a plurality of workstations so as to allow simultaneous operations at the workstations. The invention also allows for interchangeable decks so that the printer can accept reel-to-reel film or individual film cartridges.

Although the present invention has been described with respect to a photographic film printer, it will be appreciated that the turret mechanism can be applied to any photofinishing apparatus where a film cartridge is employed, for example, in a film processor, or a film scanner for converting the images on the film to digital images.

| Parts List | |
|---|---|
| 10 | apparatus |
| 12 | base |
| 16 | platform |
| 20 | turret |
| 22 (a–f) | arms |
| 24 (a–f) | nest |
| 26 (a–f) | stations |
| 28 | magazine |
| 30 | holes |
| 34 | print gate |
| 35 | print station |
| 36 (a–f) | slides |
| 38 (a–f) | actuator |
| 39 | cartridge |
| 40 | spool |
| 41 | film strip |
| 42 | clamp |
| 44,46 | drive rollers |
| 48 | notch |
| 50 | hole |
| 52 | ejector pin |
| 54 | processing section |
| 56,58 | nip rollers |
| 60 | festoon box |
| 62 | drive motor |
| 63 | drive shaft |
| 64 | encoder |
| 66 | drive motor |
| 67 | motor |
| 68 | encoder |
| 70 | drive train |
| 72 | actuator pin |
| 100 | printer |
| 102 | film supply |
| 104 | take up |
| 106 | paper supply |
| 108 | take up |
| 110 | lamp house |
| 112 | printing station |
| 114 | printing lens |
| 116 | paper exposure gate |

| -continued | |
|---|---|
| Parts List | |
| 118 | scanning station |
| 120 | slack loop |
| 122 | removable module/deck |
| 122' | deck |
| 124 | turret mechanism |
| 126 | nest |
| 128 | depression |
| 130 | scan station |
| 140 | printing station |

We claim:

1. A photofinishing apparatus, comprising:

a) a rotatable turret having at least one nest for receiving a film cartridge of the type capable of thrusting film from inside to outside the cartridge in response to rotation of a film bearing spool inside the cartridge; and b) a plurality of work stations located around the turret, a drive mechanism is provided for engaging and rotating a film spool of a cartridge located at each of the work stations for thrusting the film out of said cartridge and for returning the film back into the cartridge and an apparatus for performing an operation on the film that has been thrust out of the cartridge at the work stations, the turret is rotatable so as to move said nest to at least one successive work station for performing successive operations at said work stations.

2. A photofinishing apparatus as claimed in claim 1, wherein said photofinishing apparatus is a photographic printer.

3. A photofinishing apparatus as claimed in claim 2, wherein said plurality of work stations include a film scanning station and a printing station.

4. A photofinishing apparatus as claimed in claim 3, wherein at least one of said work stations further comprises a festoon box for receiving a film strip that has been thrust from a cartridge.

5. A photofinishing apparatus as claimed in claim 1 wherein at least one operation is being conducted at one work station simultaneously with at least one operation being conducted at a different one of said workstations.

6. A photofinishing apparatus as claimed in claim 1 said drive mechanism comprises a plurality of separate devices disposed at each station wherein film is being thrust out of the cartridge.

7. A photofinishing apparatus for use with a photographic printer, comprising:

a) a deck supported at the height of the print gate of the photographic printer;

b) a turret mounted for rotation on the deck, the turret having a plurality of nests for receiving film cartridges of the type capable of thrusting film from inside the cartridge to outside the cartridge in response to rotation of a film bearing spool inside the cartridge; and;

c) a plurality of work stations located on the deck around the turret, each work station including a drive mechanism for engaging and rotating a film spool of a cartridge located at the work station, and apparatus for performing an operation on film ejected from the cartridge at the work station.

8. A photofinishing apparatus as claimed in claim 7 further comprising a shuttle for moving a nest from the turret to the print gate of the photographic printer.

9. The apparatus claimed in claim 7, wherein one of said work stations includes an apparatus for scanning the film removed from the cartridge.

10. The apparatus claimed in claim 7, further comprising a work station for removing a cartridge from a magazine, loading the cartridge into a nest, and returning a cartridge from a nest to the magazine.

11. The apparatus claimed in claim 7, wherein said nest includes a pair of nip rollers located adjacent the film exit slot of a cartridge in said nest, said nip rollers being driveable to move film from said cartridge after film is thrust from the cartridge into the roller.

12. A photographic printer, comprising:

a film scanning station;

a printing station; and a film supply and transport mechanism for transporting both rolls of spliced film and cartridges of the type capable of thrusting film from the inside to outside and back into the cartridge to its film scanning station and printing station, wherein the means to supply and transport the cartridges comprises a turret located between the film scanning station and the printing station.

13. The photographic printer claimed in claim 12, wherein said supply and transport mechanism includes a slack loop located between the scanning station and printing station for full order scanning of spliced film, and which is manually interchangeable with said turret.

14. The photographic printer claimed in claim 12, wherein said turret includes a plurality of nests for receiving film cartridges, and said film scanning station and printing station include means for engaging a spool in a cartridge and driving said film from said cartridge into said scanning station and said printing station.

15. A photofinishing method, comprising the steps of:

supplying a film cartridge of the type capable of thrusting film from inside to outside the cartridge in response to rotation of a film bearing spool inside the cartridge to a turret having a plurality of nests, each of said nests designed to receive the cartridge; and transporting the film cartridge to a plurality of work stations located around the turret by rotating the turret, thrusting the film out of said cartridge at each of said work stations for allowing a photofinishing operation and returning the film to the cartridge after completion of said operation.

16. The photofinishing method according to claim 15 further comprising the step of conducting at least one operation at one work station simultaneously with at least one operation being conducted at a different one of said workstations.

17. The method claimed in claim 15, wherein said method is employed in a photographic printer.

18. A photographic printing apparatus, comprising:

a) a rotatable turret having at least one nest for receiving a film cartridge of the type capable of thrusting film into and out of the cartridge in response to rotation bearing the spool inside the cartridge;

b) a plurality of work stations located at around the turret, a drive mechanism is provided for engaging and rotating a film spool of a film cartridge located at each of said work stations for thrusting film into and out of said cartridge; and c) an apparatus for performing an operation on the film that has been thrust out of the cartridge at the work stations, the turret being rotatable so as to move said nest to at least one successive work station for performing successive operations at said work stations, said plurality of workstations includes a film scanning station and a printing station.

19. A photofinishing apparatus, comprising:

a) a rotatable turret having at least one nest for receiving a film cartridge of the type capable of thrusting film into and out of said cartridge in response to rotation of a film bearing spool inside the cartridge;

b) a plurality of work stations located around the turrets; and c) a drive mechanism for engaging and rotating a film spool of the film cartridge located at each of said work stations for thrusting the film into and out of said cartridge, and an apparatus for performing an operation on the film that has been thrust out of the cartridge at the work stations, said turret being rotatable so as to move said nest to at least one successive work station for performing successive operations at said work station, wherein at least one operation is being conducted at one work station simultaneously with at least one operation being conducted at different one of said work stations.

20. A photofinishing apparatus, comprising:

a) a rotatable turret having at least one nest for receiving a film cartridge of the type capable of thrusting film into and out of said cartridge in response to rotation of a film bearing spool inside the cartridge;

b) a plurality of work stations located around the turrets; and c) a drive mechanism for engaging and rotating a film spool of the film cartridge located at each of said work stations for thrusting the film into and out of said cartridge, and an apparatus for performing an operation on the film that has been thrust out of the cartridge at the work stations, said turret being rotatable so as to move said nest to at least one successive work station for performing successive operations at said work station, said drive mechanism comprises a plurality of separate devices disposed at each station where film is being thrust out of the cartridge.

* * * * *